United States Patent
Parker

[15] 3,690,397
[45] Sept. 12, 1972

[54] ELECTRIC AUTOMOBILE
[72] Inventor: Louis W. Parker, 2408 Sunrise Key Blvd., Ft. Lauderdale, Fla. 33304
[22] Filed: Dec. 16, 1970
[21] Appl. No.: 98,721

Related U.S. Application Data
[63] Continuation-in-part of Ser. No. 834,358, June 18, 1969, abandoned.

[52] U.S. Cl. ............180/65 R, 180/19 R, 180/68.5
[51] Int. Cl. ........................B60k 1/09, B50l 11/18
[58] Field of Search................180/65, 68.5, 55–63, 180/19

[56] References Cited

UNITED STATES PATENTS

| | | | |
|---|---|---|---|
| 2,906,357 | 9/1959 | Pletka | 180/65 R X |
| 628,514 | 7/1899 | Zimmermann | 180/50 UX |
| 1,124,275 | 1/1915 | Beskow | 180/55 |
| 2,448,992 | 9/1948 | Love et al. | 180/65 R UX |
| 2,993,550 | 7/1961 | Klappert | 180/65 R X |
| 3,497,027 | 2/1970 | Wild | 180/65 R |

FOREIGN PATENTS OR APPLICATIONS

| | | | |
|---|---|---|---|
| 864,977 | 2/1941 | France | 180/65 R |
| 307,672 | 5/1933 | Italy | 180/65 R |

*Primary Examiner*—Benjamin Hersh
*Assistant Examiner*—Milton L. Smith
*Attorney*—Hall, Pollock and Vande Sande

[57] ABSTRACT

An electrically propelled automobile is provided with a detachable wheeled trailer unit housed entirely within the confines of the automobile body and carrying battery units for energizing the automobile motor. The trailer unit is provided with its own motor adapted to be energized from said battery units, for self-propelling the trailer unit when it is detached from the automobile body.

15 Claims, 10 Drawing Figures

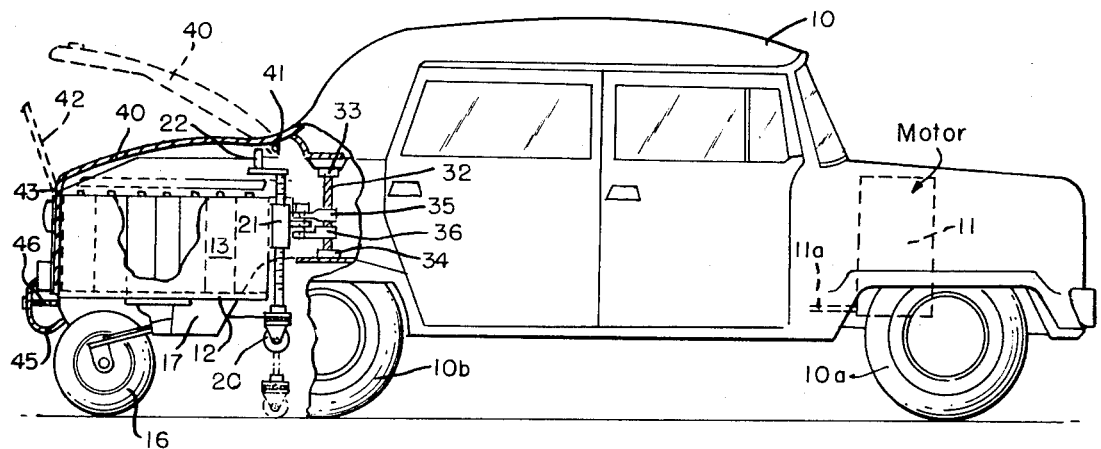
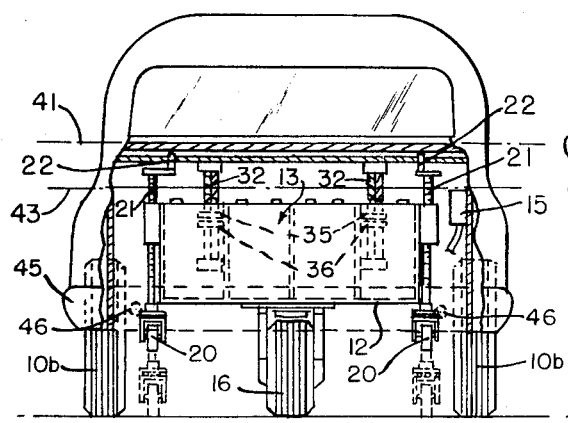
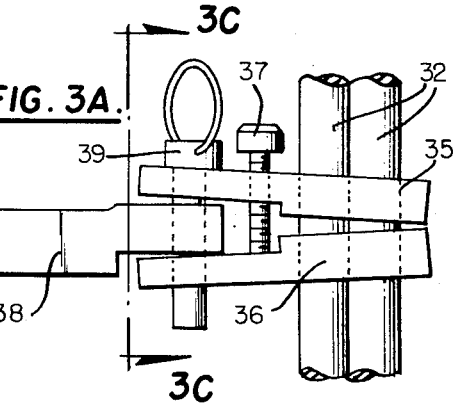
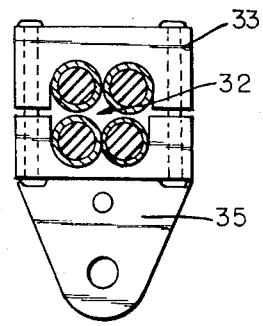
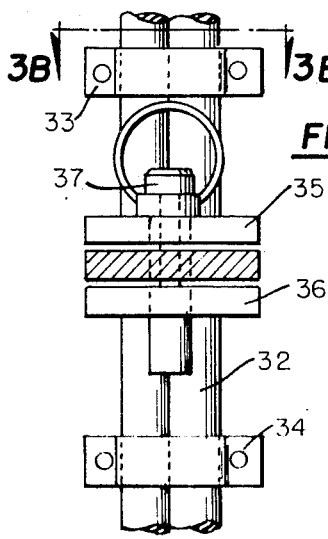

INVENTOR
Louis W. Parker
BY
ATTORNEY

INVENTOR
Louis W. Parker

BY

ATTORNEY

ELECTRIC AUTOMOBILE

CROSS-REFERENCE TO RELATED APPLICATION

The present application is a continuation-in-part of my prior copending application Ser. No. 834,358, filed June 18, 1969, for "Electric Automobile" and now abandoned.

BACKGROUND OF THE INVENTION

The concept of providing an electrically propelled automotive vehicle has long been known. In most cases, the vehicle comprises a driving motor and battery unit permanently carried in place on the vehicle chassis; but alternative arrangements have been suggested wherein the motor and battery unit are, together, mounted on a separate propulsion unit connected to the remainder of the vehicle, e.g., see Zimmerman U.S. Pat. No. 628,514 and related references such as Love et al. U.S. Pat. No. 2,448,992 and Klappert U.S. Pat. No. 2,993,550.

Commercially feasible vehicles employing permanently mounted batteries and driving motors, and capable of transporting passengers and/or freight over extended distances, have not been considered practical to the present time due primarily to limitations in the types of battery sources which have been available. Recent improvements in battery sources have revived interest in such automobiles since it has been found possible to travel longer distances between battery recharging operations. However, the continued need for battery recharging still requires that the vehicle be used only under circumstances where a recharging source is conveniently available when need for recharge arises, and further requires that the vehicle be kept out of operation for periodic significantly long time intervals during which recharging can be effected. As a result, even with recent improvements in the types of batteries available, it has still been considered necessary to restrict the use of electric automobiles to essentially urban areas, to make use of such automobiles only for relatively limited journeys of relatively short time intervals, and to make provision for relatively long recharging time intervals during which the automobile is incapacitated.

To the extent that there have been some earlier suggestions, of the types identified earlier, regarding use of a separate propulsion unit, such earlier suggestions are also impractical insofar as an electrical automobile is concerned. A separate propulsion unit mounted completely exterior to the remainder of the vehicle makes the overall vehicle unsightly and ungainly, and restricts its maneuverability. Moreover, the concept of mounting both the driving motor and batteries on a separate propulsion unit significantly increases the cost, weight, and bulk of the propulsion unit, and its exposure to possible damage.

The present invention, recognizing these disadvantages of prior electric propulsion arrangements, is concerned with an improved electric automobile wherein a fresh source of battery energization can be quickly and inexpensively substituted for a depleted battery source, thereby to extend the range of travel of the automobile and to substantially eliminate the time during which the automobile must be kept out of operation for recharging purposes. Moreover, in accomplishing these advantages, the present invention is further concerned with an improved automobile of the type described wherein the battery unit is completely hidden when in use, thereby to provide increased protection to the unit and enhanced styling and maneuverability of the automobile; and wherein the batteries and driving motor are separately mounted within the vehicle, thereby to decrease weight, cost, and servicing problems of the battery unit itself.

SUMMARY OF THE INVENTION

In accordance with the present invention, an electric automobile is provided with an electric motor of any known type adapted to be energized by battery sources of similarly known type. Only the motor, however, is permanently mounted within the automobile body. The battery source for said motor is separately mounted on a wheeled trailer unit adapted to be detachably connected mechanically to the automobile body, and detachably connected electrically to the electric motor, so as to permit the trailer unit to be quickly separated from the remainder of the automobile and replaced by a like such unit having freshly charged batteries when it becomes necessary to provide a fresh source of energization for the vehicle motor.

The trailer unit is arranged to be located entirely within the confines of the automobile so as to be nearly invisible from the exterior of the automobile. This assures that the styling (e.g., streamlining) and maneuverability of the automobile are in no way impaired by the trailer unit. The trailer unit is provided with an improved wheel arrangement and with novel means for resiliently but detachably connecting the trailer unit to the automobile chassis so as to permit the unit to be towed along and to track the path of travel of the vehicle during normal operation. The automobile body itself is provided with hinged door areas which may be selectively opened when desired to gain access to the trailer unit for disconnecting it electrically and mechanically from the automobile, and for reconnecting a new battery unit mechanically and electrically to the automobile when necessary.

The principal advantages of the invention reside in the extended range of travel which may be achieved by an electric automobile incorporating the invention; the reduced time needed to replace a depleted source of energy with a fresh source; the streamlining and maneuverability which can be effected in the overall vehicle; and the reduced cost, weight, bulk, and servicing problems, and increased protection, of the battery unit itself. Trailer mounted battery units of the type incorporated in the automobile of the present invention can be made available at highway automotive service centers where they are maintained in charged and properly serviced condition. By deploying battery lease service centers at spaced intervals along highways of travel, the operator of an electrically propelled vehicle can readily have a depleted battery source in his vehicle replaced by a fresh source of leased batteries scaled in size and power requirements to his particular automobile when necessary; and such replacement can be quickly accomplished through the simple expedient of detaching an existing battery trailer unit from his vehicle and reattaching a fresh battery unit in its place. To facilitate moving the trailer unit when it is detached from the automobile, and/or to assist attaching the unit to or detaching it from the automobile, the trailer unit may be provided with its own motor to make the unit self-propelled.

BRIEF DESCRIPTION OF THE DRAWINGS

FIG. 1 is a side view in partial section of an electric automobile incorporating the present invention;

FIG. 1A is a rear view, partially broken away, of the automobile shown in FIG. 1;

FIGS. 3A, 3B, and 3C illustrate one possible arrangement for mechanically interconnecting the battery trailer unit and automobile to one another;

DESCRIPTION OF THE PREFERRED EMBODIMENTS

Figure 2:
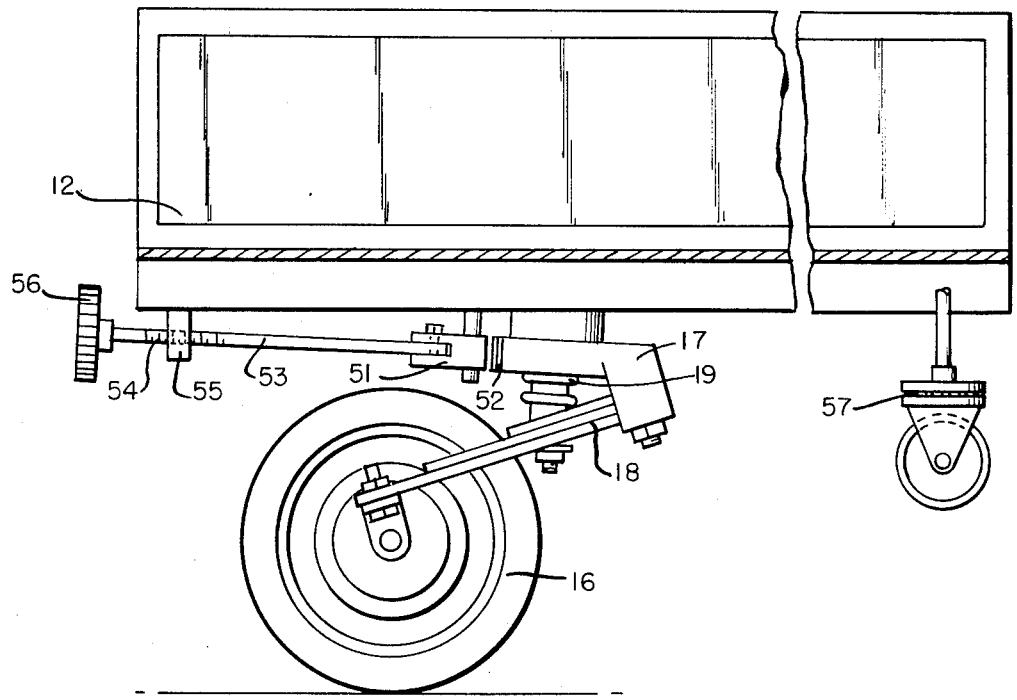
FIG. 2 is a detail view of a portion of the battery trailer unit incorporated in the vehicle of FIG. 1.

In accordance with the present invention, an electric automobile comprises a body 10 styled as desired, the term "body3[ as used herein being intended to include the automobile chassis or frame, body shell, and other permanent structural members including paired front wheels 10a and rear wheels 10b supported by appropriate axles and the like. Body 10 supports an electric driving motor 11 in permanent position for driving the automobile wheels through an appropriate power transmission (not shown). In the form of the invention shown in FIG. 1, motor 11 is mounted toward the forward portion of the automobile; but this is not mandatory, and the motor 11 may be mounted elsewhere at any convenient place in the overall body, or in the wheels, so long as it is permanently mounted in place and is distinct from the battery unit to be described. Motor 11 is provided with electrical cable means 11a for connection to said battery unit.

The battery unit which characterizes the present invention comprises a box-like carrier or frame 12 supporting a plurality of rechargeable battery cells 13 thereon; and the various battery terminals are interconnected for ultimate electrical connection to cable 11a feeding motor 11. The electrical connection between batteries 13 and motor cable 11a is detachable in nature; and the electrical connection preferably includes a junction box such as that diagrammatically shown at 15 (see FIG. 1A) located at an appropriate accessible site within the automobile body and including a readily separable electrical connector, e.g., of the releasable clamp type.

The battery carrier 12 is, as illustrated in FIGS. 1 and 1A, intended to be housed entirely within the confines of the automobile body, preferably at the rear end of the automobile within the trunk region thereof. Said carrier may be attached by any suitable means to the automobile chassis. According to my preferred method it is attached semi-rigidly to the automobile chassis by resilient, detachable mechanical connector means so that said carrier may be pulled along or towed and steered by the course of the automobile itself.

Carrier 12, and the battery cells 13 thereon, are supported for the aforementioned towing operation by means of a main supporting wheel 16 mounted for swiveling movement on a support structure 17 (see FIGS. 1 and 2); and the support for wheel 16 may include leaf springs 18 and a coil spring 19 disposed as shown (see FIGS. 2 and 2A) to minimize the effects of road shock on the overall trailer structure. Wheel 16, which is preferably of the pneumatic type, is mounted under carrier 12 at a position forward of the rearwardmost end of the automobile, and at a location substantially equidistant between the rear wheels 10b of the automobile as best shown in FIG. 1A.

The forward end of carrier 12 includes a pair of dolly wheels 20 which swivel (as at 57, in FIG. 2) to increase maneuverability of the trailer when a battery replacement is being effected. Dolly wheels 20 are, moreover, mounted for vertical movement on screw-type jacks 21 so that, by appropriate rotation of jack handles 22 the dolly wheels 20 may be moved in generally vertical directions between the retracted positions above ground level shown in full line in the drawings, and the lowered ground engaging positions shown in broken line. When the battery trailer unit is attached to the automobile chassis for towing, dolly wheels 20 are retracted to their upper positions so as to be out of ground engagement, whereby the trailer unit is supported by wheel 16 and the detachable mechanical connection between the forward end of the trailer unit and the automobile chassis, to be described. However, when the trailer unit is to be inserted into or removed from the automobile body, or when it is to be kept at a service station location for recharging purposes or between leasing operations, the dolly wheels 20 are lowered so as to provide a stable three-wheeled support for the overall unit.

Figure 2B:
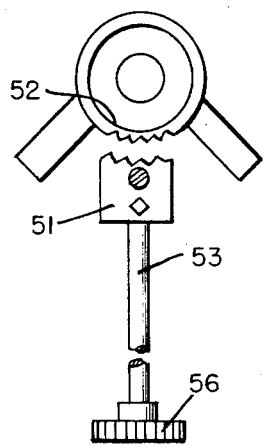
FIG. 2B illustrates a portion of the structure shown in FIG. 2A.
Figure 2A:
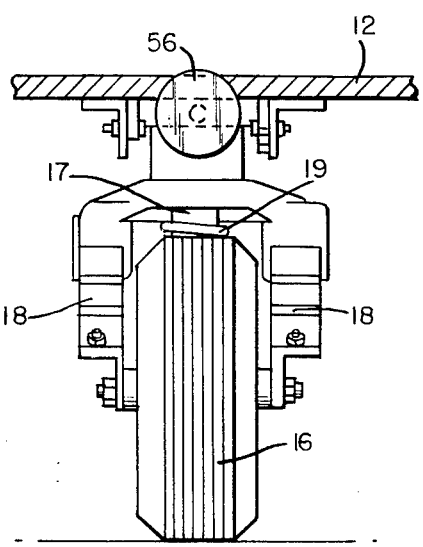
FIG. 2A is a rear view of the wheel suspension arrangement shown in FIG. 2.

It has been found that manipulation of the overall trailer unit is facilitated, when it is desired to insert the trailer unit into or remove it from the automobile body, if swiveling of the wheel 16 can be prevented under these circumstances. To that effect, as best shown in FIGS. 2, 2A and 2B, the trailer unit preferably includes a toothed portion 52 on wheel base 17 intended to be selectively engaged by a variably positioned toothed locking member 51. Locking member 51 can be moved toward portion 52 by rotating a shaft 53 in the proper direction. Shaft 53 is equipped with a screw thread 54 engaged in threaded member 55 mounted on trailer 12. The way in which member 51 engages toothed portion 52 is illustrated in FIG. 2B. By this arrangement, and through appropriate manipulation of knob 56 one can lock wheel 16 against swiveling movement, thereby to stabilize the overall carrier structure; or, alternatively, member 51 may be released from portion 52 so as to permit normal swiveling movement of wheel 16 when it is to be towed by the automobile.

Mechanical interconnection between the battery trailer unit and the automobile body is achieved by a detachable resilient mechanical connector comprising two bundles 32 of elastic ropes extending in generally vertical directions in spaced relation to one another (see FIG. 1A). Each bundle 32 is clamped together by clamps 33 and 34; and these clamped elastic rope bundles are, at the same time, secured to the automobile frame, e.g., at the clamps themselves. Each bundle is further provided, at a position between its clamps 33 and 34, with a trailer hitch comprising paired hitch members 35 and 36 clamped about the associated rope bundle and pretensioned by means of a spreading force applied thereto through tensioning screw 37.

The rearward ends of the hitch members 35, 36 are spread apart as shown in FIGS. 3A and 3C, and are adapted to receive therebetween a tongue 38 permanently attached to the front end of the battery carrier 12. There are, of course, a pair of such tongues 38 associated respectively with the pairs of rope bundles 32. Each tongue 38 is adapted to be releasably attached to the hitch members 35, 36 by means of a removable locking pin 39 of any appropriate design, designed to extend between the hitch members 35 and 36 through an associated aperture in tongue members 38 for releasably securing the battery trailer unit to the automobile body through the agency of the paired resilient rope bundles 32.

The use of two hitch assemblies horizontally spaced from one another as shown in FIG. 1A gives the trailer unit good stability for tracking, and good assurance against tipping, when the trailer is attached to the automobile body. In addition, since the trailer is attached to the automobile body through the agency of bundles of elastic ropes, rather than being rigidly attached directly to the automobile chassis, the trailer unit is capable of experiencing a limited amount of lateral, up and down, and forward and backward freedom of movement during its towing operation. Abrupt movements of the automobile, or shocks imposed on the automobile wheels, are accordingly isolated for the most part from the trailer.

As best illustrated in FIG. 1, the overall trailer unit, when mounted in place for its desired towing operation, is housed entirely within the confines of the automobile body.

The trailer accordingly does not require stop lights, nor a protective chassis cover except at its bottom, since its location within the confines of the automobile itself provides all these features. To provide access to the trailer, and to facilitate attachment and detachment thereof, the automobile body may be provided with a trunk door 40 located above the trailer and mounted for upward hinging unit above a pivot axis 41; and the automobile body may be further provided with a rear panel door 42 mounted for vertical pivotal movement about an additional hinge axis 43 located above the uppermost surface of battery cells 13. It will be appreciated, of course, that variations may be made in the access door arrangement. For example, door 42 may be mounted for horizontal swinging movement about a vertical hinge axis located at one side of the body. Alternatively, door members 40 and 42 may be combined into a single pivotal unit hinged for upward rotation about a hinge axis such as 41. In any of these arrangements, the portion of the door structure corresponding to door 42 preferably also supports the rear bumper 45 of the automobile; and releasable fasteners such as 46, e.g., comprising elongated screw members and associated threaded nuts, are provided for fastening down the bumper 45 and its associated door member at a position extending across and rearward of the trailer unit.

When it is desired to remove a depleted battery unit from the automobile, trunk door 40 is first hinged upwardly and locked in place by any appropriate means. This provides access to releasable electrical connector 15, jack handles 22, and hitch locking pins 39. The jack handles 22 may now be rotated to lower dolly wheels 20 into ground engagement. It will be appreciated, of course, that other arrangements for moving wheels 20 relative to the ground can be provided; and if some alternative arrangement is employed, it would similarly be manipulated to cause dolly wheels 20 to come into ground engagement. The electrical wiring between battery cells 13 and motor 11 is now also disconnected; and the mechanical connection between the trailer unit and the automobile chassis is disconnected by pulling locking pins 39. To facilitate the removal operation of the trailer, moreover, wheel 16 is, at this time, also preferably locked against swiveling movement by manipulation of knob 56.

When these operations have been completed, rear panel door 42 can be rotated to its upward position, and the battery trailer unit is pulled away from the automobile. A fresh battery supply can now be readily inserted into place by rolling it into the vacated region at the rear end of the automobile, whereafter this new unit is prepared for its towing and energizing operations through an additional series of steps reverse to that already described, i.e., electrical and mechanical connection is made between the battery unit and automobile, dolly wheels 20 are retracted, and the door units 40, 42 are closed and locked in place.

While it is possible to move the trailer unit manually, for purposes of attaching it to a vehicle, detaching it therefrom, or maneuvering it when it is separated from the vehicle, these operations can, if desired, be facilitated by adding a self-powered feature to the trailer unit. An arrangement of this alternative type is shown in FIGS. 4 and 5.

Figure 4:
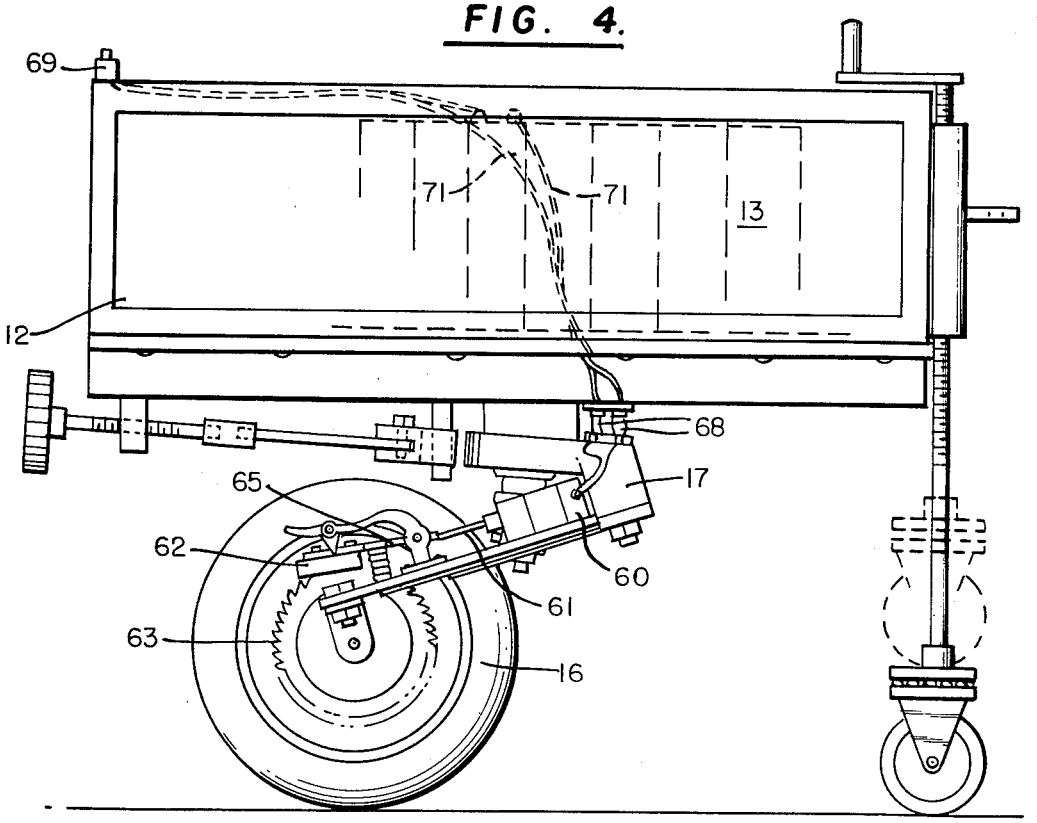
FIG. 4 is a side view of a modification of the invention.
Figure 5:
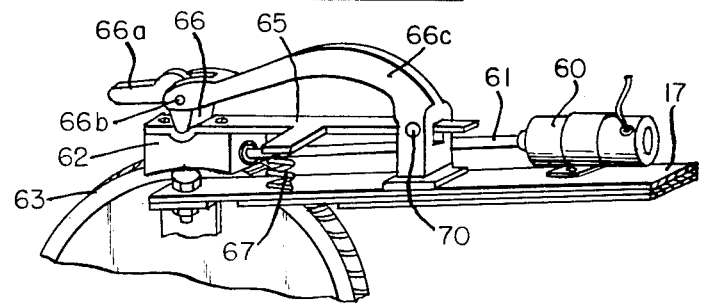
FIG. 5 is a detail view of the driving mechanism employed in the modification of FIG. 4.

The trailer unit shown in FIGS. 4 and 5 is entirely similar to that already described, with the exception that the unit is modified to incorporate a reversible electric motor 60 adapted to supply motive power to the trailer 12. Motor 60 is fastened to the previously described swivel mechanism 17; and a flexible shaft 61, driven by motor 60, rotates a driving worm gear (not shown) which is encased within a housing 62 (see FIGS. 4 and 5). The worm gear in housing 62 is, in turn, designed to selectively engage a gear 63 fastened to wheel 16 of the trailer unit.

The aforementioned worm gear is supported within housing 62 by means of appropriate bearings; and the housing 62 is in turn attached to an elongated lever 65 which is pivoted relative to swivel mechanism 17 at a pivot 70. When lever 65 and its attached housing 62 are pivoted in a clockwise direction about pivot 70 (as viewed in FIGS. 4 and 5) the worm gear in housing 62 disengages gear 63. Conversely, when housing 62 and lever 65 are moved in a counterclockwise direction about pivot 70, the worm gear can be moved into driving engagement with gear 62. Thus, the actual position of housing 62 relative to gear 63 determines whether or not drive can be effected between said worm gear and gear 63.

The position of housing 62 is controlled by the combination of a spring 67, and a locking cam 66 provided with a manually operable handle 66a pivoted at 66b to an elongated fixed arm 66c (see FIG. 5). Spring 67 is located between support structure 17 and lever 65, and normally urges housing 62 (and the worm gear therein) away from gear 63. The housing 62 can, however, be moved into close proximity to gear 63 against the force of spring 67 by manipulating handle 66a into the position shown in FIG. 5, whereby cam 66 forceably presses downwardly on the top of lever 65. By this arrangement, the worm gear in housing 62 can be moved into engagement with gear 63 to permit the trailer unit to be self-propelled when the unit is separated from (or being attached to or detached from) the automobile; and, conversely, the worm gear in housing 62 can be moved to a disengaged position relative to gear 63, so as to render the entire driving mechanism inoperative when the trailer unit is actually being towed by its associated automobile.

Motor 60 is connected, via appropriate electrical contacts 68, and a three-position manual switch 69, to battery cells 13 carried by trailer unit 12. For this purpose, appropriate electrical conductors 71 can be provided, as diagrammatically illustrated in FIG. 4, extending from contacts 68 to battery cells 13 and to manual switch 69. Switch 69 is, preferably, of the well-known three-position type, and is provided with an "off" position, a "forward" position, and a "reverse" position. Switch 69 is manually operated to a selected one of its three positions to energize reversible motor 60 in its forward or reverse directions, or to remove all energization therefrom. The requirement that switch 69 be manually operated acts as a safety feature since, particularly in combination with movable housing 62, it tends to assure that drive cannot possibly be effected to the trailer unit at an undesired time. When the hand is removed from switch 69 it automatically returns to "off" position removing the motive power. Due to the locking action of worm 62 and gear 63 when they are engaged, the trailer comes to an abrupt stop when motor 60 loses power.

The contacts 68 mentioned previously, are preferably of the two-part type and comprise upper contact portions 68a attached to the bottom of the trailer unit, and lower contact portions 68b attached to the support structure 17. The two cooperating portions 68a and 68b are positioned to electrically engage one another only when the support unit (or swiveling yoke) 17 is in an "in-line" position, i.e., a position wherein the trailer unit, if self propelled, will move directly forward or backward. If the wheel 16 is turned to one side, electrical continuity between contact portions 68a and 68b is broken, thereby assuring that no drive can be effected to the trailer unit.

While the trailer is resting on three wheels and the large wheel is in straight locked in position, turning motion is possible whether the trailer is self-propelled or not, due to the swiveling property of the two small wheels. This requires, of course, that a sideways push be applied manually to the trailer until the small wheels turn to the appropriate position. To turn these wheels back to the straight line position also requires a manual push sideways.

It will be appreciated that the arrangements described, by locating a trailer battery unit within the confines of the automobile itself, and in separate detachable relation to the automobile and a driving motor carried thereby, assures that a fresh battery supply can be quickly and inexpensively substituted for a depleted supply when desired. The arrangement further assures that the battery unit used for this purpose can be less expensive, and lighter in weight than would be the case if the driving motor itself formed a portion of the trailer unit and had to be mechanically connected or disconnected from the automobile wheels as part of the replacement operation. By housing the trailer unit within the confines of the automobile body, moreover, maneuverability of the automobile is in no way impaired and, in addition, the overall automobile is capable of streamlined styling. At the same time, existing portions of the automobile provide excellent protection for the battery unit thereby obviating the need for separate protective covers, bumpers, and the like.

While in the above description the battery carrier unit has been shown attached near the rear end of the automobile, the invention is equally applicable to a carrier unit attached near the front end of the vehicle with the hood covering it in a manner similar to the illustrated rear deck and for similar purposes. The motor in this case may be near the rear end of the car, or in the wheels.

Having thus described my invention, I claim:

1. An electrically propelled automobile comprising an automobile body, an electric driving motor fixedly mounted within said body for driving the wheels of said automobile, a separable electric battery unit located within the confines of said body in spaced relation to said motor and wheels, said electric battery unit comprising a towable three-wheeled carrier supporting a plurality of battery cells thereon, said three-wheeled carrier comprising a single main supporting wheel, mounted between the sides of said carrier to support said carrier when it is being towed by said automobile, and a pair of spaced auxiliary wheels cooperating with said main wheel to support said carrier when it is separated from said automobile, separable electrical connector means for detachably connecting said cells to said driving motor, and separable mechanical connector means for detachably connecting said carrier to said body, said mechanical connector means including a resilient linkage between said carrier and said body for absorbing shocks when said carrier is being towed.

2. The automobile of claim 1 wherein said body includes hingedly connected door means adapted to be selectively opened to expose said electrical and mechanical connector means to permit attachment and detachment of said connector means when desired.

3. The automobile of claim 2 wherein said door means and said wheeled carrier are disposed adjacent the rear end of said automobile, said wheeled carrier being positioned within the confines of said body between a pair of rear wheels of said automobile and being towed by said automobile as a separable trailer unit.

4. The automobile of claim 1 wherein said main supporting wheel is in permanent ground engagement, said auxiliary wheels being mounted for swiveling motion and being in engagement with the ground only when said carrier is separated from said automobile body, and means for moving said auxiliary wheels relative to said carrier and out of engagement with the ground when said carrier is mechanically connected to said body.

5. An electrically propelled automobile comprising an automobile body, an electric driving motor fixedly mounted within said body for driving the wheels of said automobile, a separable electric battery unit located within the confines of said body in spaced relation to said motor and wheels, said electric battery unit comprising a wheeled carrier towed by said automobile as a separable trailer unit and having a supporting wheel depending therefrom mounted for swiveling movement, said wheeled carrier being positioned within the confines of said body between a pair of rear wheels of said automobile and supporting a plurality of battery cells thereon, separable electrical connector means for detachably connecting said cells to said driving motor, and separable mechanical connector means for detachably connecting said carrier to said body, said body including hingedly connected door means disposed adjacent the rear end of said automobile and adapted to be selectively opened to expose said electrical and mechanical connector means to permit attachment and detachment of said connector means when desired.

6. The automobile of claim 5 including means for selectively preventing swiveling movement of said supporting wheel.

7. An electrically propelled automobile comprising an automobile body, an electric driving motor fixedly mounted within said body for driving the wheels of said automobile, a separable electric battery unit located within the confines of said body in spaced relation to said motor and wheels, said electric battery unit comprising a wheeled carrier supporting a plurality of battery cells thereon, separable electrical connector means for detachably connecting said cells to said driving motor, separable mechanical connector means for detachably connecting said carrier to said body, said wheeled carrier comprising wheel means in permanent ground engagement, variably positionable further wheel means adapted to be in engagement with the ground only when said carrier is separated from said automobile body, and means for moving said further wheel means out of engagement with the ground when said carrier is mechanically connected to said body, said last-named means comprising mechanically operable jack means for selectively retracting and lowering said further wheel means in a generally vertical direction.

8. An electrically propelled automobile comprising an automobile body, an electric driving motor fixedly mounted within said body for driving the wheels of said automobile, a separable electric battery unit located within the confines of said body in spaced relation to said motor and wheels, said electric battery unit comprising a wheeled carrier supporting a plurality of battery cells thereon, separable electrical connector means for detachably connecting said cells to said driving motor, and separable mechanical connector means for detachably connecting said carrier to said body, said mechanical connector means comprising a resilient linkage located between said carrier and said body and having resilient cables attached to said body, and a separable mechanical connection between said carrier and said resilient cables.

9. An electrically propelled automobile comprising an automobile body, an electric driving motor fixedly mounted within said body for driving the wheels of said automobile, a separable electric battery unit located within the confines of said body in spaced relation to said motor and wheels, said electric battery unit comprising a wheeled carrier supporting a plurality of battery cells thereon, separable electrical connector means for detachably connecting said cells to said driving motor, separable mechanical connector means for detachably connecting said carrier to said body, said wheeled carrier being located within the rear trunk area of said body for towing by said automobile, said rear trunk area including hingedly connected door means arranged to be selectively opened to facilitate insertion of said carrier into said rear trunk area and removal of said carrier means therefrom, rear bumper means carried by said door means for movement with said door means when said door means is opened and closed, and separable locking means for locking said bumper means to said body at a position rearward of said carrier when said door means is closed.

10. The automobile of claim 1 including a further electric motor mounted on said carrier, coupling means for selectively energizing said further motor from said electric battery unit, and drive means coupling said further motor to the main supporting wheel of said carrier for effecting self-propelled motion of said carrier when said carrier is detached from said automobile body.

11. The automobile of claim 10 wherein said main supporting wheel is mounted for swiveling motion about a center position, said coupling means including contact means for interrupting the energization of said further motor from said battery unit when said main supporting wheel moves away from said center position.

12. The automobile of claim 10 wherein said drive means includes a pair of gears positioned to mesh with one another, and manually operable means for moving said gears toward and away from one another to render said drive means selectively operative and inoperative.

13. The automobile of claim 10 wherein said further electric motor comprises a reversible motor, said coupling means including manually operable switch means for controlling the energization of said reversible electric motor to control its direction of rotation.

14. A separable battery unit for an electrically propelled automobile of the type comprising an automobile body having an electric driving motor fixedly mounted within said body for driving the wheels of said automobile, said separable electric battery unit comprising a carrier unit supported on at least one wheel and adapted to be located within the confines of said automobile body in spaced relation to said motor, a plurality of battery cells mounted on said carrier unit, separable electrical connector means for detachably connecting said cells on said carrier unit to said automobile driving motor, separable mechanical connector means for detachably connecting said carrier unit to said automobile body, a further motor mounted on said carrier unit for self-propelling said carrier unit when it is detached from said automobile, further electrical connector means for connecting said cells to said further motor, said further electrical connector means including manually operable switch means for controlling the energization of said further motor, said switch means being constructed to return automatically to its "off" position when manual manipulation of the switch by an operator is terminated thereby automatically to de-energize said further motor, and drive means for coupling said further motor to at least one supporting wheel of said carrier unit, said drive means including gear means arranged to transfer drive unidirectionally from said further motor to said supporting wheel and operative, when said further motor is de-energized upon return of said switch means to its "off" position, automatically to bring said carrier unit to an abrupt halt, said gear means including manually engageable and disengageable means for selectively rendering said drive means inoperative.

15. The combination of claim 13 wherein said manually operable switch means is constructed to return automatically to its "off" position when manual operation of the switch ceases.

* * * * *